March 13, 1962

G. A. LEFFLER 3,025,446

CONTROLLING MOTOR FOR MECHANICAL SETTING OF
REGULATING MEMBERS IN REGULATING SYSTEMS

Filed July 30, 1958

INVENTOR
GUSTAV ALLAN LEFFLER

BY *Toulmin & Toulmin*

ATTORNEYS

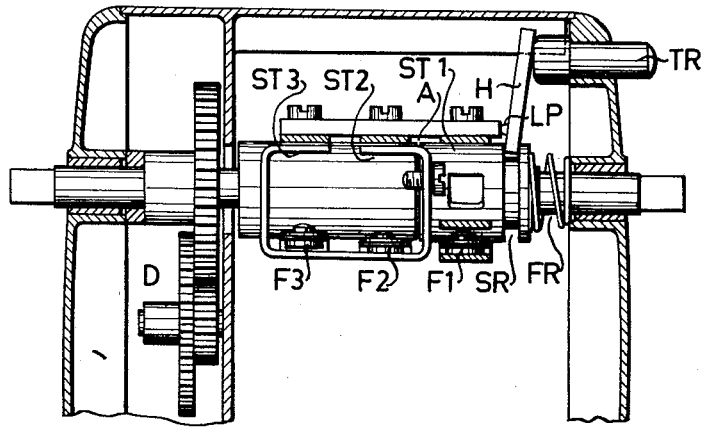
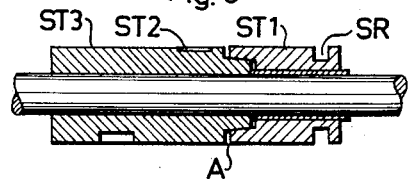
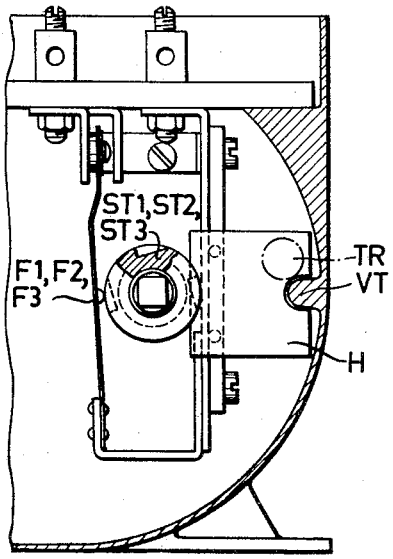

United States Patent Office 3,025,446
Patented Mar. 13, 1962

3,025,446
CONTROLLING MOTOR FOR MECHANICAL SETTING OF REGULATING MEMBERS IN REGULATING SYSTEMS
Gustav Allan Leffler, Enskede, Stockholm, Sweden, assignor to Installationsfirma Allan Leffler, Stockholm, Sweden, a firm of Sweden
Filed July 30, 1958, Ser. No. 752,127
Claims priority, application Sweden Aug. 9, 1957
2 Claims. (Cl. 318—467)

The present invention relates to a controlling device including a motor for mechanical setting of regulating members in regulating systems for flowing media, e.g. ventilating, firing or liquid-conducting systems, the setting being effected by means of contacts for switching in and switching off the motor, said contacts being alternatively operable by an actuating member driven by the motor and consisting, for instance, of a rotating roll, cams provided on a common shaft, or the like. The actuating member is driven by the motor e.g. via a toothed gearing. The different positions into which the regulating member may be brought by the controlling motor, are definitively determined through the design of the rotating roll, e.g. recesses or elevations on the roll determining by reason of their angular positions when the corresponding contacts have to close and open, respectively, the circuit of the motor. Now, it is desirable that one or more of the settings of the regulating member may be chosen at will without encroachment upon the motor, its gear pinion or on the rotating roll having to be made during operation. According to the invention, this choice is made possible due to the fact that the actuating member consists of at least two elements or units, of which at least one is fixedly united with a member driven from the motor and follows the movements of said member, while at least one of the remaining members is united with the former by means of a disengageable coupling so that its angular position in relation to said member may be altered and fixed.

According to a further development of the invention, connected to the controlling motor is a change-over member, by means of which the switching in and switching off, respectively, of the motor may be brought to be effected either by a contact which is actuated by a part of the actuating member, said part being fixedly connected to the driving member, or by a contact actuated by a part of said actuating member releasably connected to the same driving member. The changeover member may be a manually adjustable change-over device, a relay or a contactor.

The invention will be more closely explained in conjunction with examples of realization represented in the accompanying drawings.

FIG. 3 shows the coupling of the controlling motor according to the invention as employed in an oil heating plant or the like.

FIGS. 4 to 6 show an example of realization of the controlling motor, in which the contacts and the actuating roll are joined to the motor.

Figure 1:
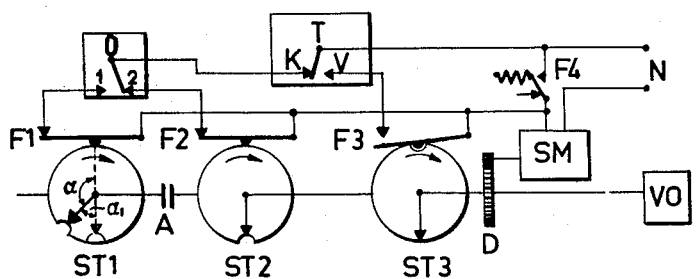
FIG. 1 shows an example of realization of the coupling of the controlling motor according to the invention with a change-over device adjustable by hand.

In FIG. 1 it is assumed that, via a toothed gear D with reduction, the controlling motor SM drives a shaft, which is connected to a regulating member VO (damper or the like). Connected to this shaft is also a roll switch having the rotating roll ST1, ST2, ST3 and the stationary contacts F1, F2, F3. In the example, the roll is divided into two parts ST1 and ST2, ST3. The part ST2, ST3 is fixedly connected to the shaft of the regulating member, while the member ST1 is connected to said shaft via a releasable shaft coupling A. By temporarily releasing the shaft coupling, the mutual angular position of the two roll members may be displaced. The contacts F1, F2, F3 are actuated owing to the fact that their movable spring carries a pin which slides on the surface of the roll while being pressed against the same by the spring. In the path on the roll on which each pin slides, there is provided at a point a recess having an extenson which, in the direction of the circumference, is slightly greater than that of the pin. When this recess is located in front of the pin, this latter falls down into the recess so that the spring changes its position. In this instance, the contacts F1, F2, F3 are designed to form break contacts.

The controlling motor is driven from the network N and one of its poles is directly connected to the network, while the other pole is connected via the change-over switches T and O as well as via any one of the contacts F1, F2, F3. In order to allow the controlling motor to start, the roll must have such a position that one of the contacts F1, F2, F3 is closed. The recesses of the roll have such mutual positions that only one of the contacts is open at a time. The recess at ST2 is displaced one-half revolution in relation to the recess at ST3, while the angular position of the recess ST1 in relation to those of the two other recesses may be adjusted in the manner previously mentioned.

While setting out from the state shown in FIG. 1 and supposing that the change-over switch T has just changed from the position V to the position K, the controlling motor starts and begins to turn the regulating member and the roll switch by means of the toothed gear D. In consequence, the contact F3 is closed but, to begin with, this is of no importance, since the connection via the contact part V is open. The controlling motor now continues to operate until the roll has been turned one-half revolution and the recess at ST2 has reached the pin of the spring of the contact F2. This contact now opens the circuit of the controlling motor so that it stops. At that time, the shaft of the regulating member has been turned one-half revolution.

Provided the regulating member is to be returned to its previous position, the change-over switch T is adjusted by hand or automatically into the position V. Since the contact F3 is now in a closed position, the controlling motor starts and turns the regulating member and the roll switch one-half revolution, whereupon the contact is opened and the controlling motor stops. If the change-over switch T is shifted again, the play begins anew.

If it is now desirable to give the regulating member a position in one case, which is not corresponded by one-half revolution of the shaft, the roll member ST1 is turned, after a temporary release of the shaft coupling A, into an angular position corresponding to the desired position of the regulating member. Thus, if now the change-over switch O is placed in the position 1, the roll member ST1 and the contact F1 will determine one position of the regulating member, while the roll member ST2, ST3 and the contact F3 determine the other position.

The desired angular position of the roll member ST1 is set by the aid of a retracting contact F4, by means of which the motor may be started independently of the position of the roll switch. In this connection it is set out from that state which is present when the roll member ST2, ST3 occupies such a position that the contact F3 has just been opened and has stopped the controlling motor. This position is set by the aid of the contact F4 independently of the positions of the change-over switches. The shaft coupling A is now released, and the controlling motor is started by means of the contact F4 and is allowed to turn the regulating member until this latter reaches the desired position. Then the controlling motor is stopped by that the contact F4 is released and opens. The roll member ST1 has now obtained an angular position $\alpha_1$ in relation to the roll member ST2, ST3, said position corresponding to the desired position of the regulating member. Thereupon, the two parts of the shaft coupling are again brought into engagement. If the change-over switch O is in the position 1 and the change-over switch T passes from the position V to the position K, the controlling motor starts and turns the regulating member and the roll switch until the roll has turned through the angle $\alpha$, the pin of the movable spring of the contact F1 then falling down into the recess of the roll member ST1, and the contact opens and stops the controlling motor. Thus, when the change-over switch O occupies the position 1 and the change-over switch T is in the position K, the regulating member will always stop already when its shaft has turned through the angle $\alpha$. By means of the change-over switch it may thus be possible to choose one of these two positions, of which the one corresponding to the angle $\alpha$ may be set at will.

Figure 2:
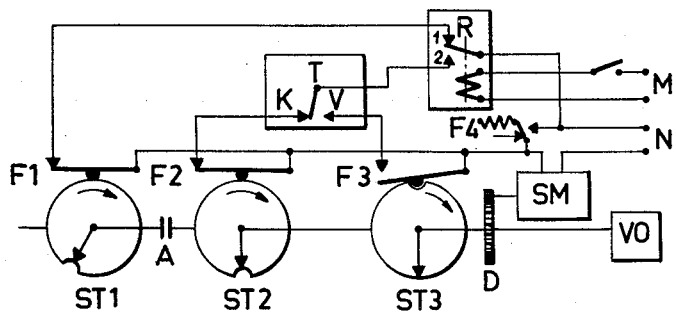
FIG. 2 shows an example of realization of the coupling, in which the change-over device is a relay or a contactor.

In FIG. 2 the change-over switch O is replaced by a contactor R, which is operated by that its controlling coil receives voltage from the network M.

Figure 3:
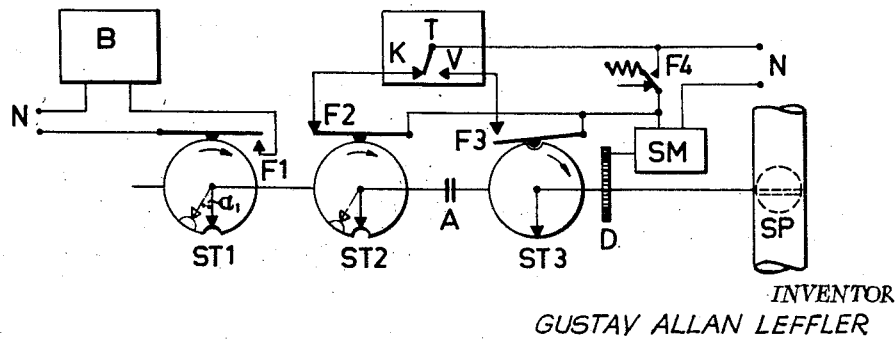

In FIG. 3 the controlling motor is used in an oil heating plant provided with thermostat. By means of the controlling motor SM, a damper SP fitted in the flue is adjusted so that it is in a closed position when the burner is extinguished, and is open when the burner is in the ignited state. In a manner corresponding to that according to FIGS. 1 and 2, the controlling motor turns the damper via a toothed gear D. On the same shaft as the damper there is arranged the three-pole roll switch ST1, ST2, ST3. The member ST3 of the roll, said member actuating the contact F3, is fixedly united with the shaft of the damper, while the member ST1, ST2 is united, via the releasable shaft coupling A, with the same shaft. The contact F1 starts the oil burner by applying the line voltage N, causing the ventilator to start, oil to be supplied and the ignition device to be operated. The contact F2 starts the controlling motor by applying the line voltage N via the thermostat when its change-over switch T occupies the position K at the lower temperature limit, while the contact F3 starts the controlling motor when the change-over switch is in the position V at the upper temperature limit.

As to the contacts on the roll switch, F1 is a make contact, while F2 and F3 are break contacts. The recesses in the roll member ST1, ST2, which actuate the contacts F1 and F2, have the same angular position on the roll member, and hence their mutual angular position is fixed. The roll member ST1, ST2 may now, by releasing the shaft coupling A, be displaced in its angular position in relation to the roll member ST3 and be fixed in the new position. This latter member is fixedly adjusted in relation to the damper in such a manner that the recess in the same is situated just in front of the pin when the damper is closed, and is displaced one-half revolution in relation to the pin when the damper is fully open.

The device operates in the following manner:

It is assumed in FIG. 3 that the roll member ST1, ST2 is set in such a way in relation to the roll member ST3 that the recesses in the former are displaced one-half revolution in relation to the recess in the latter.

The figure shows the position when the temperature has reached the lower limit and the change-over device of the thermostat occupies the position K. The controlling motor now starts, the contact F2 being in closed position, so that the motor obtains line voltage. It begins to open the damper, the contact F3 then being closed. However, for a while this causes no action, since the change-over device of the thermostat still occupies the position K. When the roll has turned one-half revolution, and the damper has been completely opened, the contact F2 opens so that the controlling motor stops and the contact F1 closes, the burner being thus ignited. Since the controlling motor is at a standstill, the contact F1 is maintained closed and the burner operates. Now the temperature rises and when it has reached the upper limit, the change-over device of the thermostat passes to the position V. Inasmuch as the contact F3 has been closed during the operation of the controlling motor in the previous operating cycle, this latter obtains line voltage via F3 and V and begins to close the damper. As a result, the contact F1 immediately opens and the burner is extinguished. The contact F2 will now be closed but does not obtain line voltage, since the change-over switch of the thermostat occupies the position V. When the roll has turned one-half revolution, the damper is in a closed position and the contact F3 is opened and the controlling motor is stopped. This condition lasts until the temperature has fallen to the lower limit, when the play begins anew.

If it is not necessary fully to open the damper when the burner has to ignite, e.g. since the burner is caused to operate at a low effect, it is possible to displace the roll member ST1, ST2 in relation to ST3 e. g. through an angle $\alpha_1$ in the direction of rotation by a temporary release of the coupling A. While setting out from the starting condition previously assumed, the contact F3 will now open when the angle $\alpha_1$ remains of the half revolution, thus at an earlier moment. Hence, the damper will not be opened completely. The angle $\alpha_1$ may be chosen according to the operating conditions existing in each separate case. The plant functions in the manner previously described, yet with the difference that, when the upper temperature limit has been reached, the damper turns at first into a fully open position before it begins to be closed.

The setting of the position of the damper into the open condition is effected by means of the contact F4 in the same manner as described in connection with the example of realization according to FIG. 1.

In FIGS. 4 to 6 there is represented an example of realization of the controlling motor, where the contacts and the actuating roll in the form of a roll switch are joined with the motor, FIG. 4 showing a top view, FIG. 5 a rear view and FIG. 6 the actuating roll with the shaft coupling, all in section. In these figures, the same reference characters as in FIGS. 1 to 3 are used for corresponding details of the apparatus.

FIGS. 4 and 5 show the switch with the contacts F1, F2, F3 and the rotating roll ST1, ST2, ST3. The regulating member and the roll are connected to the driving shaft of the toothed gear driven by the motor. The roll member ST2, ST3 is fixedly united with the toothed gear, while the roll member ST1 is releasably connected with the same via the shaft coupling A. The coupling is formed as a friction clutch from the two parts of the roll, the end of the roll member ST2, ST3 turned towards the roll member ST3 being arranged to form an outward cone, which is fitted into a matching inward cone of the roll element ST1. The spring FR presses the roll element ST1, which is free to move on the shaft, against the roll member ST2, ST3 so that they normally engage each other. By means of the lever H the roll member ST1 may be liberated from the roll member ST2, ST3 when the angular position of the former in relation to that of the latter has to be changed. The lever consists of a flat plate, which is mounted at the point LP, is carried by the bead VT on the frame of the motor and engages the groove SR of the roll member ST1. By means of the push button TR, which is mounted in one shield of the motor and is accessible from outside and which acts on the free end of the lever, the coupling A is released by the lever against the influence of the spring FR upon the change of the angular position of the roll member ST1.

Although the invention has been described on the basis of the examples of realization included in the description, other embodiments are possible without departing from the inventive idea stated in the following claims.

What I claim is:

1. An apparatus for adjusting a fluid regulating device and comprising a control motor, a first shaft drivingly connected to said motor and also connected to the fluid regulating device, a plurality of cam means on said first shaft, a second shaft, cam means on said second shaft, means for detachably connecting said second shaft to said first shaft whereby the angular position of said second shaft with respect to said first shaft can be selectively adjusted, a plurality of contact arms respectively actuated by said cam surfaces, said control motor being connected across a source of electrical energy through said contact arms, and means for connecting certain of said contact arms into the circuit of the motor and the source of electrical energy to energize and de-energize said motor and to control the degree of movement of said motor and said regulating device, said shaft connecting means comprising a coupling having one part thereof on said first shaft and another part thereof on said second shaft, and means for resiliently urging said parts into engagement to drivingly connect said first and second shafts.

2. An apparatus for adjusting a fluid regulating device and comprising a control motor, a first shaft drivingly connected to said motor and also connected to the fluid regulating device, a plurality of cam means on said first shaft, a second shaft, cam means on said second shaft, means for detachably connecting said second shaft to said first shaft whereby the angular position of said second shaft with respect to said first shaft can be selectively adjusted, a plurality of contact arms respectively actuated by said cam surfaces, said control motor being connected across a source of electrical energy through said contact arms, and means for connecting certain of said contact arms into the circuit of the motor and the source of electrical energy to energize and de-energize said motor and to control the degree of movement of said motor and said regulating device, said shaft connecting means comprising a coupling having one part thereof on said first shaft and another part thereof on said second shaft, and means for resiliently urging said parts into engagement to drivingly connect said first and second shafts, said shaft connecting means further comprising a lever having one end thereof engaging one part of said coupling and a push button rod engaging the other end of said lever to pivot said lever so as to disengage said coupling.

References Cited in the file of this patent

UNITED STATES PATENTS

| | | |
|---|---|---|
| 2,184,701 | Kriechbaum et al. | Dec. 26, 1939 |
| 2,211,769 | Drake | Aug. 20, 1940 |
| 2,425,589 | Aubert | Aug. 12, 1947 |
| 2,474,595 | Richardson | June 28, 1949 |
| 2,912,527 | Naimer | Nov. 10, 1959 |